United States Patent [19]

Ogata et al.

[11] Patent Number: 5,419,865
[45] Date of Patent: May 30, 1995

[54] PLASTIC MOLDING METHOD

[75] Inventors: Eiji Ogata; Shokichi Seki, both of Fukushima, Japan

[73] Assignee: Tohoku Munekata Co., Ltd., Fukushima, Japan

[21] Appl. No.: 241,670

[22] Filed: May 12, 1994

Related U.S. Application Data

[62] Division of Ser. No. 103,805, Aug. 10, 1993, abandoned.

[30] Foreign Application Priority Data

Aug. 12, 1992 [JP] Japan .................. 4-214949

[51] Int. Cl.⁶ ............................................. B29C 39/36
[52] U.S. Cl. ........................... 264/328.1; 249/64; 264/336; 425/577; 425/468
[58] Field of Search ........... 264/328.1, 334, 336, 264/318; 249/63, 64, 144, 151; 425/577, 556, 438, 468

[56] References Cited

U.S. PATENT DOCUMENTS

| | | | |
|---|---|---|---|
| 3,049,784 | 8/1962 | Cullen ............................... | 264/336 |
| 3,397,441 | 8/1968 | Rich ................................. | 312/7.1 |
| 3,595,337 | 3/1970 | Furey et al. ..................... | 312/7.1 |
| 4,395,075 | 7/1983 | Barrett et al. . | |
| 4,395,079 | 7/1983 | Barrett et al. ................... | 312/7.1 |
| 4,550,230 | 10/1985 | Johnson . | |
| 4,600,622 | 7/1986 | Carlson et al. ................. | 428/131 |
| 4,873,043 | 10/1989 | Meyers .............................. | 264/336 |
| 5,167,898 | 12/1992 | Luther .............................. | 264/328.1 |
| 5,252,279 | 10/1993 | Gore et al. ...................... | 428/131 |

FOREIGN PATENT DOCUMENTS

| | | |
|---|---|---|
| 0349460 | 1/1990 | European Pat. Off. . |
| 0471459 | 2/1992 | European Pat. Off. . |
| 2530985 | 2/1984 | France . |
| 3431005 | 3/1986 | Germany . |

*Primary Examiner*—Jill L. Heitbrink
*Attorney, Agent, or Firm*—Stevens, Davis, Miller & Mosher

[57] ABSTRACT

A method of making plastic molding consists of a box-like body having an field of multiple fine conical holes. The internal diameter of the fine conical holes gradually decreases from the inner surface of the plastic molding toward the outer surface of the plastic molding, and is in the range 0.1-0.5 mm at the outer surface. The fine conical holes are hardly visible when the outer surface of the box is viewed; ventilation is provided without detriment to the aesthetic appearance of the exterior of the box, and it is not necessary to cover the ventilation holes in the box to keep them out of sight. Conical projection on a male mold are withdrawn before the plastic molding hardens completely and the male mold is separated from a female mold after the plastic material has hardened completely.

1 Claim, 3 Drawing Sheets

PLASTIC MOLDING METHOD

This application is a division of application Ser., No. 08/103,805, filed Aug. 10, 1993, abandoned.

BACKGROUND OF THE INVENTION

This invention relates to a plastic molding, for use for example as a case (box) for a piece of acoustic equipment containing a speaker, which has multiple holes passing from the inner surface to the outer surface for sound emission or ventilation, etc., and a method for manufacturing the plastic molding and a mold for manufacturing the molding.

Among for example acoustic equipments containing loudspeakers, of those having a construction in which a box and a speaker baffle are made as one plastic molding, most have holes for sound emission opened in the part of the box in front of the speaker and also have net for protecting the speaker fitted as a speaker baffle over the area where the sound emission holes are.

Other types do away with the speaker protecting net, and incorporate a net like area into the plastic molding as the speaker baffle instead. This approach is effective for products in which the speaker part is to be emphasized as an aesthetic feature, but for products in which it is desirable that the speaker be hidden this approach is not suitable and in practice a speaker protection net is used.

FIG. 3 is an outline cross-sectional view of the locality of the speaker in a conventional plastic molding of this kind used as the case (box) of an acoustic equipment containing a speaker. In FIG. 3, reference numeral 1 denotes the speaker; 2 denotes the molded plastic box; 3 denotes the through holes for sound emission formed in the box 2; 4 denotes a spacer wall formed on the inside surface of the box 2 around the through holes 3; and 5 denotes a sound chamber formed by the speaker 1, the box 2, and the spacer wall 4. Reference numeral 6 denotes a baffle mounted on the outer surface of the box 2 and covering the through holes 3 for speaker protection and aesthetic improvement. In this kind of conventional plastic molding, in forming the through holes in the box it is not possible to make the internal diameter of the holes small; the holes in the box are conspicuous, the appearance of the exterior of the box is spoiled, and it is therefore necessary to use a covering net or the like to keep the holes out of sight.

SUMMARY OF THE INVENTION

One aim of this invention is to provide a box consisting of a plastic molding in which ventilation is provided without detriment to the aesthetic appearance of the exterior of the box and with which it is not necessary to cover the ventilation holes in the box.

Another aim of this invention is to provide a manufacturing method, for manufacturing a box consisting of a plastic molding in which ventilation is provided without detriment to the aesthetic appearance of the exterior of the box and with which it is not necessary to cover the ventilation holes in the box to keep them out of sight, with which method there is no breaking off of pieces or cracking of the molding at the time of molding removal, and plastic moldings can be produced with consistent quality, simply and at low cost.

Another aim of this invention is to provide a mold for plastic molding, for manufacturing a box consisting of a plastic molding in which ventilation is provided without detriment to the aesthetic appearance of the exterior of the box and with which it is not necessary to cover the ventilation holes in the box to keep them out of sight, with which mold there is no breaking off of pieces or cracking of the molding at the time of molding removal, and plastic moldings can be produced with consistent quality, simply and at low cost.

A further aim of this invention is to provide a mold for plastic molding, for manufacturing a box consisting of a plastic molding in which ventilation is provided without detriment to the aesthetic appearance of the exterior of the box and with which it is not necessary to cover the ventilation holes in the box to keep them out of sight, in which mold the fluidity of the plastic material in the region of the ventilation holes is improved, no sink marks occur in the region of the ventilation holes, and plastic moldings can be produced with consistent quality, simply and at low cost.

1st Invention

A plastic molding according to this invention consists of a box which is provided with a field of multiple fine conical through holes, the internal diameter of which gradually decreases from the inner surface of the box toward the outer surface of the box. It is desirable that the internal diameter of the conical holes at the outer surface of the box be in the range 0.1–0.5 mm.

Because according to this invention the box is provided with a field of multiple fine conical through holes the internal diameter of which gradually decreases from the inner surface of the box toward the outer surface of the box, the fine conical holes are hardly visible when the outer surface of the box is viewed.

As described above, with a plastic molding according to this invention, the fine conical holes in the box are hardly visible when the outer surface of the box is viewed; ventilation is provided without detriment to the aesthetic appearance of the exterior of the box, and it is not necessary to cover the ventilation holes in the box to keep them out of sight.

2nd Invention

In a plastic molding manufacturing method according to this invention, a male mold provided with multiple conical projections is positioned onto a female mold in such a way that the tips of the conical projections abut onto the facing surface of the female mold. A molten plastic material is poured into the space between the male mold and the female mold and allowed to harden. Before the plastic material hardens completely the conical projections are withdrawn, and after the plastic material has hardened completely the male mold is separated from the female mold. The box is then removed. The removed box has a field of multiple fine conical holes formed in it.

As described above, according to the plastic mold manufacturing method of this invention, by positioning a male mold provided with multiple conical projections onto a female mold in such a way that the tips of the conical projections abut onto the facing surface of the female mold, pouring a molten plastic material into the space between the male mold and the female mold and allowing it to harden, withdrawing the conical projections before the plastic material hardens completely, and separating the male mold from the female mold and removing the box after the plastic material has hardened completely, good mold separation in the region where the multiple fine conical holes are formed is made possible, and a box in which the fine conical holes are hardly visible when the outer surface of the box is viewed, and ventilation is provided without detriment to the aesthetic appearance of the exterior of the box and it is not necessary to cover the ventilation holes in the box to keep them out of sight, can be produced without there being any breaking off of pieces or cracking of the molding at the time of molding removal, and with consistent quality, simply and at low cost.

3rd Invention

The molding mold of this invention is made up of a female mold and a male mold which is positioned onto the female mold; part of the mold surface of the male mold is formed by a body separate from that which forms the rest of the surface, this separate body can be advanced and withdrawn with respect to the rest of the mold and has multiple fine conical projections projecting from it. With a mold constructed according to this invention, because part of the mold surface of the male mold is formed by a body which is separate from that which forms the rest of the surface and which can be advanced and withdrawn with respect to the rest of the mold, this part of the male mold can be withdrawn and separated from the box before the box has completely hardened, and good mold separation in the region in which the multiple fine conical holes are formed can be achieved.

As described above, with a mold according to this invention, by means of part of the male mold being withdrawn and separated from the box before the box has completely hardened, good mold separation in the region in which the multiple fine conical holes are formed can be achieved, and a box in which ventilation is provided without detriment to the aesthetic appearance of the exterior of the box and it is not necessary to cover the ventilation holes in the box to keep them out of sight can be produced without there being any breaking off of pieces or cracking of the molding at the time of molding removal, and with consistent quality, simply and at low cost.

4th Invention

The molding mold of this invention is made up of a female mold and a male mold which is positioned onto the female mold, and part of the mold surface of the male mold has multiple fine conical projections projecting from it; a material of fine-holed structure is inlaid into the part of the mold surface of the female mold that faces the region of the male mold that has the multiple fine conical projections, and this material of fine-holed structure provides discharge passages which absorb and release the air that remains in the space between the male and female molds.

With a mold constructed according to this invention, because a material of fine-holed structure is inlaid into the part of the mold surface of the female mold that faces the region of the male mold that has the multiple fine conical projections, and this material of fine-holed structure provides discharge passages which absorb and release the air that remains in the space between the male and female molds, the air that remains in the space between the male and female molds is effectively discharged.

As explained above, with a mold constructed according to this invention, the air that remains in the space between the male and female molds can be effectively discharged, and the fluidity of the plastic material in the region of the ventilation holes can be improved. As a result, a box in which ventilation is provided without detriment to the aesthetic appearance of the exterior of the box and it is not necessary to cover the ventilation holes in the box to keep them out of sight can be produced without sink marks occurring in the region of the ventilation holes, and with consistent quality, simply and at low cost.

DETAILED DESCRIPTION OF THE PREFERRED EMBODIMENT

A preferred embodiment of the present invention will now be described, with reference to the accompanying drawings.

Figure 1:
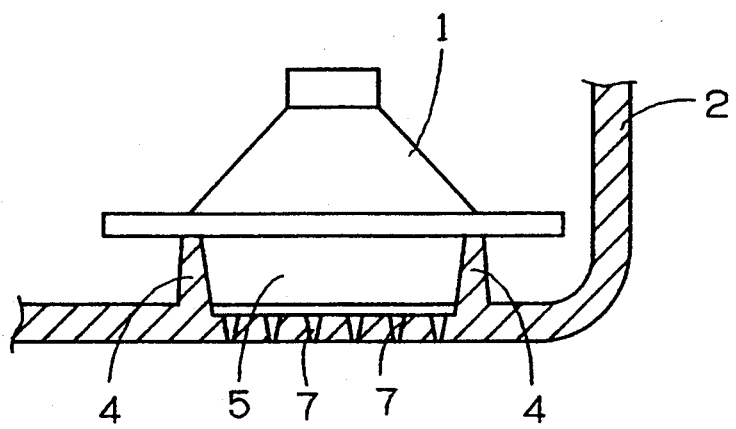
FIG. 1 is an outline cross-sectional view of the locality of a speaker mounted in a plastic molding according to a preferred embodiment of the present invention.

FIG. 1 is an outline cross-sectional view of the locality of a speaker mounted in a plastic molding according to a preferred embodiment of the invention. In FIG. 1, reference numeral 7 denotes a field of multiple fine conical holes provided in the box 2 for sound emission. The internal diameter of the holes gradually decreases from the inner surface of the box toward the outer surface; the diameter at the outer surface is in the range 0.1–0.5 mm, and the diameter at the inner surface is in the range 0.9–1.1 mm. As a result, the fine conical holes 7 are hardly visible when the exterior of the box 2 is viewed.

Figure 3:
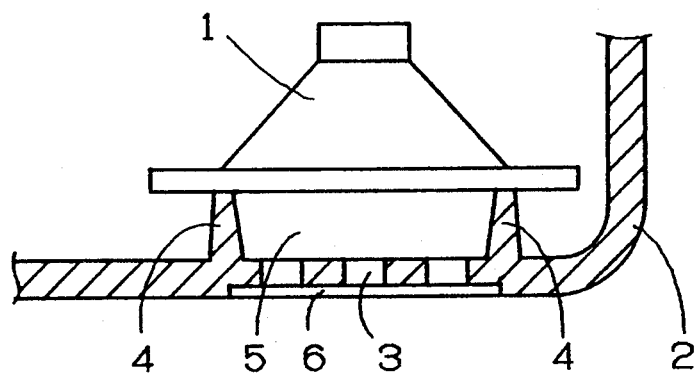
FIG. 3 is an outline cross-sectional view illustrating the construction of a conventional plastic molding in the locality of a speaker mounted upon it.

In other respects the construction is similar to that of the conventional example shown in FIG. 3.

Figure 2:
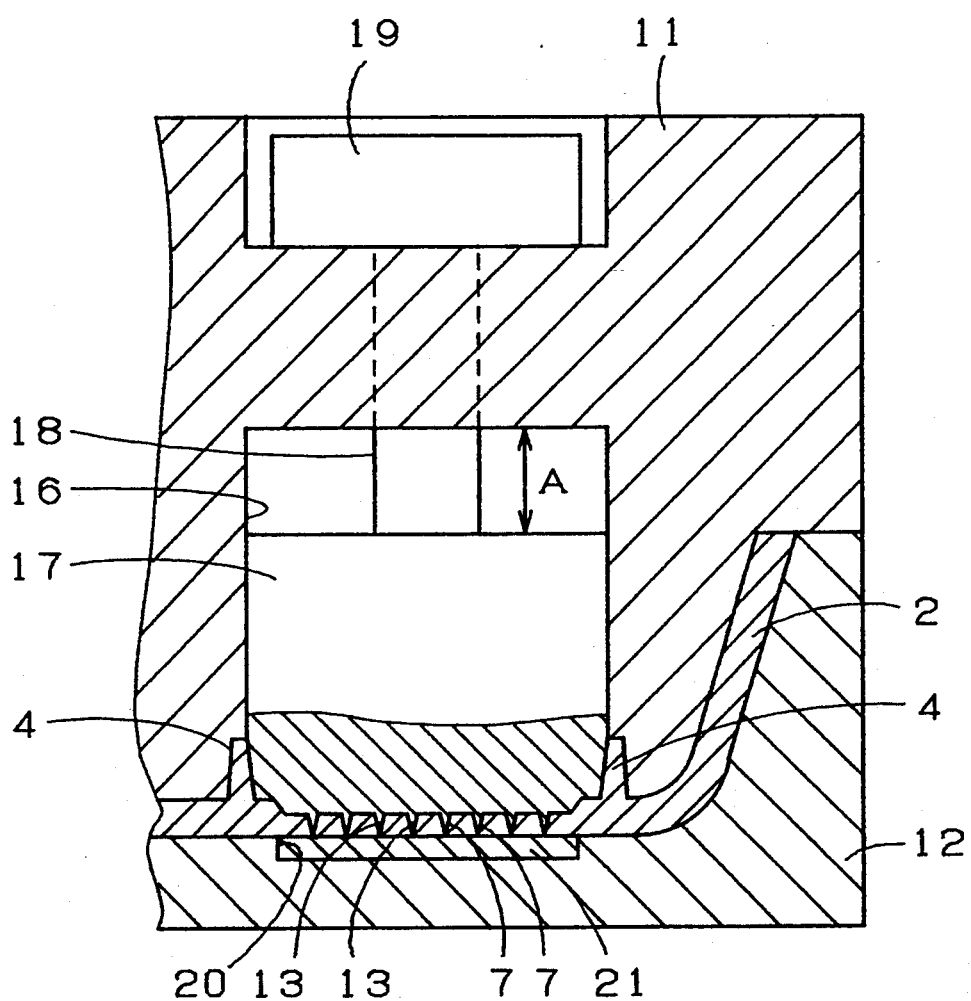
FIG. 2 is an outline cross-sectional view illustrating the manufacture of the plastic molding shown in FIG. 1.

The manufacturing method of the box 2 will now be explained, with reference to FIG. 2.

A male mold 11 provided with multiple fine conical projections 13 of a diameter at the tip in the range 0.1–0.5 mm is positioned on a female mold 12 in such a way that the tips of the fine conical projections 13 abut onto the facing surface of the female mold 12. A molten plastic material is poured into the space between the male mold 11 and the female mold 12 and allowed to harden. Here, before the plastic material hardens completely the conical projections 13 are withdrawn, and after the plastic material has hardened completely the male mold 11 is separated from the female mold 12. The box 2 is then removed. The removed box 2 has a field of multiple fine conical holes 7, of diameter 0.1–0.5 mm at the outer surface, formed in it.

In this preferred embodiment, because a field of multiple fine conical through holes whose internal diameter gradually decreases from the inside surface of the box toward the outer surface of the box and whose diameter at the outer surface of the box is in the range 0.1–0.5 mm is formed in the box 2, the fine conical holes 7 are hardly visible when the outer surface of the box 2 is viewed, the box 2 is ventilated without detriment to the aesthetic appearance of the exterior of the box, and it is not necessary to cover the ventilation holes in the box (the fine conical holes 7) to keep them out of sight. And, with this manufacturing method, good mold separation in the region in which the multiple fine conical holes are formed is achieved, and the box 2 can be produced without there being any breaking off of pieces or cracking of the molding at the time of molding removal, and with consistent quality, simply and at low cost.

And, because the holes 7 created in the box 2 are conical and are of large diameter at the inner surface of the box 2, even though the fine conical holes 7 are of small diameter at the outer surface of the box, sounds from the speaker 1 are efficiently radiated out of the box.

Next, the mold will be described.

The mold is made up of a female mold 12 and a male mold 11 which is positioned on the female mold as discussed above; part of the mold surface of the male mold 11 is formed by a body separate from that which forms the rest of the surface, and this part can be advanced and withdrawn with respect to the rest of the mold and has multiple fine conical projections of tip diameter in the range 0.1–0.5 mm projecting from it.

Specifically, a hole 16 is provided in the main mold in the area where the conical holes are to be created in the plastic molding, and a plate 17 with fine conical projections 13 formed on it is fitted in the hole 16 in such a way that it can be advanced and withdrawn (in the direction indicated by the arrow A). This plate 17 is linked by a shaft 18 to a cylinder 19, which is exposed on the outside of the mold 11, in such a way that by moving the cylinder 19 back and forth the plate 17 can be advanced and withdrawn with respect to the mold surface. Withdrawing the plate 17, before the box 2 completely hardens, removes the fine conical projections 13 from the box 2.

The female mold 12 is provided with a concave portion 20 in the area of the mold surface facing the plate 17, and a material of fine-holed structure 21 such as a ceramic plate or sintered metal alloy plate which provides discharge passages which absorb and release the air that remains in the space between the male mold 11 and the female mold 12 is inlaid into this concave portion 20.

When the male mold 11 is given the construction described above, if the plate 17 is withdrawn and pulled away from the box 2 before the box 2 has completely hardened, good mold separation in the region in which the fine conical holes 7 are formed is achieved.

And, when the female mold 12 is given the construction described above, the material of fine-holed structure 21 effectively absorbs and releases the air that remains in the space between the male mold 11 and the female mold 12, the molding resin can be poured into the space between the densely-packed fine conical projections 13 without air blockages occurring, and no sink marks occur in the region of the fine conical holes 7 in the box 2.

The shape, material and manufacturing method of the fine conical projections 13 will now be described.

The fine projections 13 are conical with a tip diameter in the range 0.1–0.5 mm and a diameter at the base in the range 0.9–1.1 mm. A mold having these fine conical projections 13 can be made simply using ordinary mold manufacturing technology. However, because there are problems associated with the formation of fine holes during injection molding, conventionally it has not been economic to make plastic moldings having fine holes, but in this preferred embodiment, by using a mold with the construction described below, a plastic molding having fine holes can be manufactured with consistent quality, simply and at low cost.

With this preferred embodiment, the fine conical projections 13 are given a length in the range 1–2 mm, quenched steel is used as the material for the projections, and the surface roughness is reduced almost to the limit. The female mold 12 is provided with a concave portion 20 in the area of the mold surface facing the multiple fine conical holes 13, and a material 21 of fine-holed structure which provides discharge passages which absorb and release the air that remains in the space between the male mold 11 and the female mold 12 is inlaid into this concave portion 20; the air that remains in the space between the male mold 11 and the female mold 12 is thereby effectively discharged, and the fluidity of the plastic material poured into the space between the female mold 12 and the male mold 11 is increased. As a result, the box 2 can be produced without sink marks occurring in the region around the fine conical projections 13, and with consistent quality, simply and at low cost.

And, with this preferred embodiment, because a plate 17 with fine conical projections 13 formed on it is incorporated into the male mold 11 in such a way that it can be advanced and withdrawn relative to the rest of the male mold 11, and the fine conical projections 13 are removed from the box 2 by withdrawal of the plate 17 before the box 2 completely hardens, good mold separation in the region of the box 2 in which the multiple fine conical holes 7 are formed is achieved. As a result, there is no breaking off of pieces or cracking of the box 2 at the time of molding removal and the box 2 can be produced with consistent quality, simply and at low cost.

What is claimed is:

1. A plastic molding manufacturing method for manufacturing a boxy body having an area of multiple fine conical holes, the manufacturing method comprising the steps of: positioning a male mold provided with multiple fine conical projections onto a female mold in such a way that the tips of the conical projections abut onto the facing surface of the female mold; pouring a molten plastic material into the space between the male mold and the female mold and allowing it to harden; withdrawing the conical projections before the plastic material hardens completely; and separating the male mold from the female mold after the plastic material has hardened completely.

* * * * *